United States Patent
Schindler et al.

(10) Patent No.: US 12,019,191 B2
(45) Date of Patent: Jun. 25, 2024

(54) METHOD FOR IDENTIFYING A CHANGE OF A RANGE OF A LIDAR SENSOR

(71) Applicant: MERCEDES-BENZ GROUP AG, Stuttgart (DE)

(72) Inventors: Philipp Schindler, Karlsruhe (DE); Andreas Scharf, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/034,962

(22) PCT Filed: Jul. 28, 2021

(86) PCT No.: PCT/EP2021/071132
§ 371 (c)(1),
(2) Date: May 2, 2023

(87) PCT Pub. No.: WO2022/096167
PCT Pub. Date: May 12, 2022

(65) Prior Publication Data
US 2023/0324528 A1 Oct. 12, 2023

(30) Foreign Application Priority Data
Nov. 3, 2020 (DE) ...................... 10 2020 128 877.8

(51) Int. Cl.
*G01C 3/08* (2006.01)
*G01S 7/487* (2006.01)
(Continued)

(52) U.S. Cl.
CPC .............. *G01S 7/487* (2013.01); *G01S 7/497* (2013.01); *G01S 17/931* (2020.01)

(58) Field of Classification Search
CPC ......... G01S 7/487; G01S 7/497; G01S 17/931
See application file for complete search history.

(56) References Cited

U.S. PATENT DOCUMENTS 10,942,277 B1 * 3/2021 Angus ................... G01S 7/4813
2019/0378282 A1 * 12/2019 Rogan .................... G06T 7/251
(Continued)

FOREIGN PATENT DOCUMENTS

| DE | 19948252 A1 | 6/2001 |
| DE | 102016201250 A1 | 8/2017 |

(Continued)

OTHER PUBLICATIONS

Ortyn, William E. et al. "Sensitivity measurement and compensation in spectral imaging." Sep. 12, 2006. Wiley Online Library. https://onlinelibrary.wiley.com/doi/full/10.1002/cyto.a.20306 (Year: 2006).*

(Continued)

*Primary Examiner* — Samantha K Nickerson
(74) *Attorney, Agent, or Firm* — PATENT PORTFOLIO BUILDERS PLLC (57) ABSTRACT

A method for identifying a change of a range of a lidar sensor involves a lidar sensor receiving a reference noise level of infrared radiation. A signal-to-noise ratio of infrared radiation reflected on the reference target and received by the lidar sensor are identified in a reference measurement having a reference target located at a predetermined distance to the lidar sensor. In a driving operation measurement, a current noise level of received infrared radiation is identified and a theoretical distance to a position where the reference target ought to be if, at the current noise level, the same signal-to-noise ratio applies as in the reference measurement is identified from the current noise level. A change in range calculation identifies a difference between the predetermined distance and the theoretical distance. The difference corresponds to the change of the range of the lidar sensor compared to its range during the reference measurement.

10 Claims, 4 Drawing Sheets

(51) Int. Cl.
  *G01S 7/497* (2006.01)
  *G01S 17/931* (2020.01)

(56) References Cited

U.S. PATENT DOCUMENTS

2020/0052799 A1* 2/2020 Jarrot .................... H04B 13/02
2020/0086871 A1* 3/2020 Gotoda ................ G05D 1/0088

FOREIGN PATENT DOCUMENTS

| DE | 102018126497 A1 | 4/2020 |
| DE | 102020115252 A1 | 12/2021 |
| EP | 2637038 A1 | 9/2013 |

OTHER PUBLICATIONS

International Search Report and Written Opinion mailed Nov. 10, 2021 in related/corresponding International Application No. PCT/EP2021/071132.

Office Action created Aug. 12, 2021 in related/corresponding DE Application No. 10 2020 128 877.8.

* cited by examiner

METHOD FOR IDENTIFYING A CHANGE OF A RANGE OF A LIDAR SENSOR

BACKGROUND AND SUMMARY OF THE INVENTION

Exemplary embodiments of the invention relate to a method for identifying a change of a range of a lidar sensor for a vehicle or a robot.

DE 199 48 252 A1 discloses a method for identifying states in a system for an automatic longitudinal and transverse control of a motor vehicle, working according to the lidar principle for identifying soiling of a sensor. The state identification depends on two indicators, which are formed from signals received and emitted by the sensor. The indicators are weighted with weight factors and are tied to a single probability, wherein a message about a soiling of the sensor is derived from the probability if a predetermined threshold value is exceeded or not reached for a predetermined period of time. The period of time chosen is hereby larger when the vehicle speed is low than when the vehicle speed is fast. An object stability, which indicates a rate of identification failures of a target object chosen for a longitudinal control of the vehicle, and a total of all objects identified during a measurement are used as indicators.

Furthermore, DE 10 2020 115 252.3 describes a method and a device for identifying dirt on a protective screen of a lidar sensor. Here, a detection range of the lidar sensor is subdivided into several sections, wherein it is identified section-by-section whether there is soiling on the protective screen in the respective section. To this end, a section background noise in the respective section is identified and a background noise in the detection range is identified in a remaining detection range or the whole detection range, wherein it is concluded that there is soiling in the respective section if the section background noise is significantly lower than the background noise in the detection range. Alternatively, or additionally, a section background noise in the respective section is identified when there are different sensitivities of a receptor of the lidar sensor, wherein it is then concluded that there is soiling in the respective section if a section background noise identified when there is relatively high sensitivity is not significantly higher than a section background noise identified when there is relatively low sensitivity.

Exemplary embodiments of the invention provide an innovative method for identifying a change of a range of a lidar sensor for a vehicle or a robot.

In the method for identifying a change of a range of a lidar sensor for a vehicle or a robot, a reference noise level of infrared radiation received by means of the lidar sensor and a signal-to-noise ratio of infrared radiation reflected on the reference target and received by the lidar sensor are identified in a reference measurement having a reference target located at a predetermined distance to the lidar sensor. In a driving operation measurement, during a driving operation of the vehicle or robot, a current noise level of infrared radiation received by means of the lidar sensor is identified and a theoretical distance to a position where the reference target ought to be if, at the current noise level, the same signal-to-noise ratio applies as in the reference measurement is identified from the current noise level. Furthermore, a difference is identified between the predetermined distance and the theoretical distance in a calculation of a change in range, wherein the difference corresponds to the change of the range of the lidar sensor compared to its range during the reference measurement.

For example, for an automated, in particular highly automated or autonomous, vehicle or robot, a current visual range of a sensor, also referred to as the sensor range or detection range, significantly determines driving parameters, such as, for example, a maximum speed or a minimum distance to other vehicles, robots, or objects. A reliable identification of a current visual range of a sensor is therefore an essential criterion for the safety of autonomously driving vehicles and robots. This especially applies to lidar sensors, as reference sensors for a range determination of objects.

By means of the present method, a reliable and trustworthy assessment of the visual range of a sensor during a lifetime of the lidar sensor is enabled. An availability of systems using data collected by means of the lidar sensor can thus be significantly increased. Due to a measuring of the noise, a reliable assessment of a trustworthy range of the lidar sensor is hereby enabled, even without the existence of targets. The method is hereby at least largely independent of an exact type of object in the field of vision, which is often used for other assessments and is subject to big variations, like, for example, dirty vehicles or road signs. If a whole noise curve is identified, distance-based values can also be identified, if, for example, a very bright road surface reflects more sunlight in relation to a dark road surface, as often occurs in repaired spots of a road surface. The range assessment can furthermore be carried out independently for solid angles, which provides an increase of information for a system degradation.

In a possible embodiment of the method, the range is defined as a distance, wherein the signal-to-noise ratio corresponds to a predetermined threshold value. This enables a simple and exact identification of the range.

In a further possible embodiment of the method, a path-dependent damping of lidar radiation is taken into consideration when identifying the theoretical distance in the driving operation measurement. Accuracy when identifying the range can thereby be further increased.

In a further possible embodiment of the method, the reference measurement is carried out again after a defined time. This enables an updating of the reference noise level identified in the reference measurement and of the signal-to-noise ratio at the reference target, so that, for example, effects of ageing of the lidar sensor can be taken into consideration.

In a further possible embodiment of the method, a change of an intrinsic noise component of the lidar sensor is taken into consideration when identifying the reference noise level in the reference measurement. Due to taking the intrinsic noise component into consideration, the reference noise level can be recreated in operation, under controlled conditions, and ageing effects can be taken into consideration during the lifetime of the lidar sensor in a simple manner and with high reliability.

In a further possible embodiment of the method, the consideration of the change of the intrinsic noise component occurs computationally, in that the reference noise level and the signal-to-noise ratio at the reference target are corrected by a respective component, which follows from the intrinsic noise component. Complex process steps for taking into consideration the change of the intrinsic noise component can thus be eliminated.

In a further possible embodiment of the method, the intrinsic noise component is identified during dead measuring time of the lidar sensor, in which a receiver of the lidar sensor is shielded from external radiation, in that in the dead measuring time, a reference infrared signal is sent to the receiver by means of a source of infrared radiation arranged inside the lidar sensor and a dark phase noise level is identified. Such an identification of the intrinsic noise component, carried out using a "dark reading" protected against external radiation and/or light, using a defined reference infrared signal of a source of infrared radiation, enables an exact reproduction of the reference noise level in operation, under controlled conditions, so that ageing effects of the lidar sensor during its lifetime can be reliably taken into consideration. The source of infrared radiation is, for example, a power-controlled infrared LED.

In a further possible embodiment of the method, the dark phase noise level is identified as an average of several dark phase noise levels. Variations that occur during the process can thus be compensated for.

In a further possible embodiment of the method, the dark phase noise level is identified during the driving operation of the vehicle or robot. An additional identification of the dark phase noise level outside of the driving operation is therefore not necessary. Consequently, additional workshop visits, for example for carrying out reference measurements, can be eliminated.

In a further possible embodiment of the method, the reference measurement is carried out as an end-of-line test at the end of producing the vehicle or robot, wherein this can simply be integrated into a production process of the vehicle or robot.

Exemplary embodiments of the invention are illustrated in greater detail below by means of drawings.

BRIEF DESCRIPTION OF THE DRAWING FIGURES

Here.

Parts that correspond to one another are provided with the same reference numerals in all figures.

DETAILED DESCRIPTION

Figure 1:
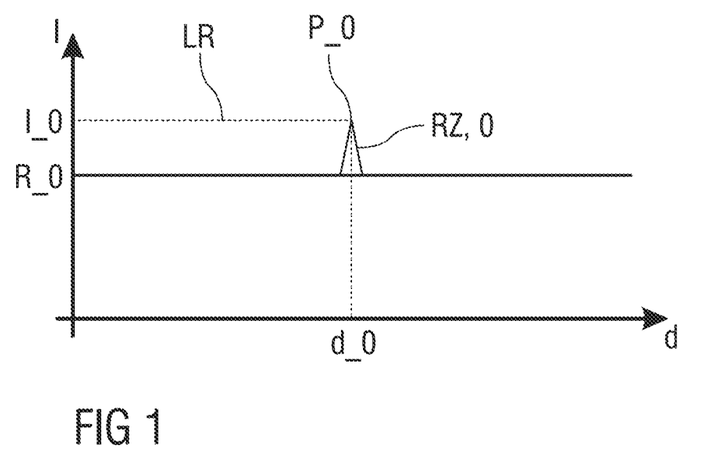
FIG. 1 schematically shows an intensity of lidar reflection in relation to a distance to an object, identified in a reference measurement, FIG. 2 schematically shows an intensity of lidar reflection in relation to a distance to an object in comparison to the reference measurement according to FIG. 1, identified at night, FIG. 3 schematically shows the intensity of lidar reflection in comparison to the reference measurement according to FIG. 2 as well as an identification of a position of a reference target at a reduced noise level, identified at night, FIG. 4 schematically shows an intensity of a lidar reflection in relation to a distance to an object in comparison to the reference measurement according to FIG. 1 as well as an identification of a position of a reference target at a higher noise level, identified in sunlight, FIG. 5 schematically shows a comparison of an intensity of a lidar reflection in relation to a distance to an object, identified in a reference measurement, a measurement taken at night, and a measurement taken in sunlight, FIG. 6 schematically shows a lidar sensor in a first state of a mirror and FIG. 7 schematically shows the lidar sensor according to FIG. 5 in a second state of the mirror.
Figure 6:
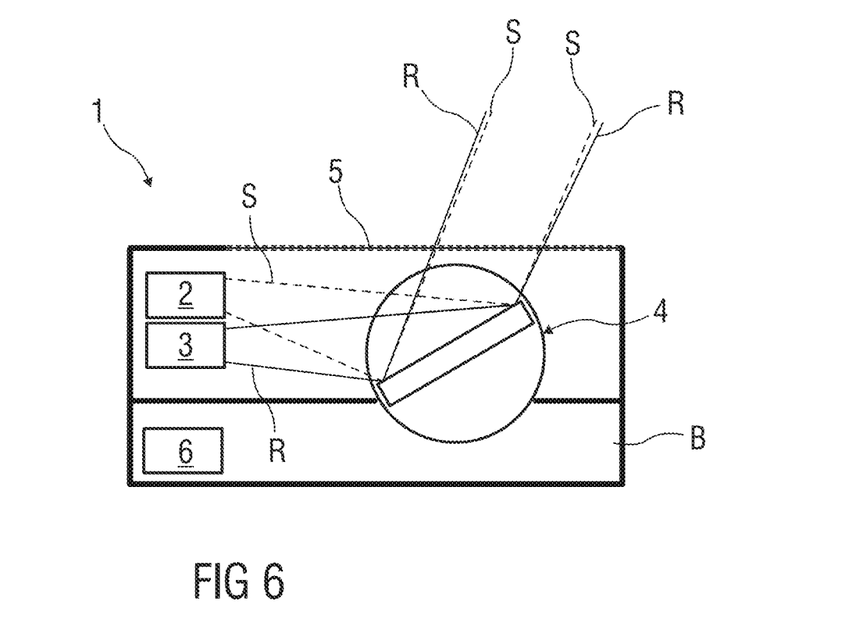
Figure 7:
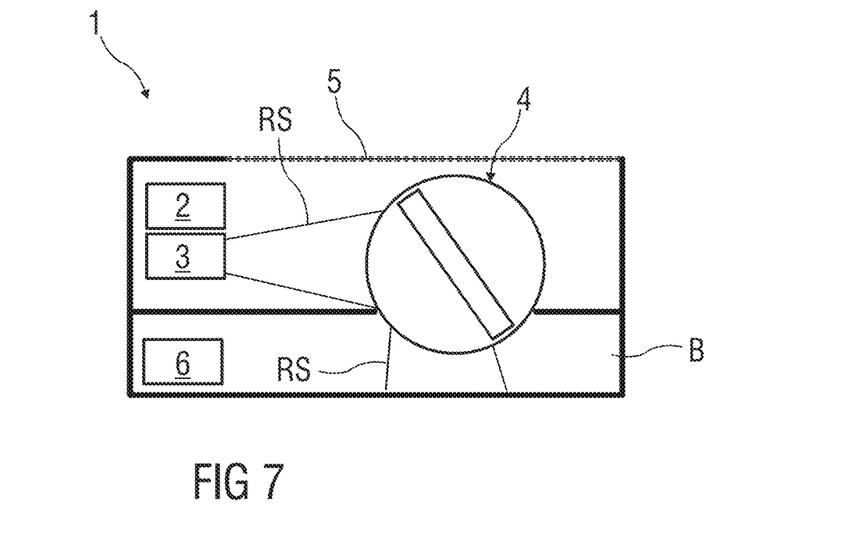

In FIG. 1, an intensity I of a lidar reflection LR received by means of a lidar sensor 1, for example represented in FIGS. 6 and 7, a distance d to an object O formed as a reference target RZ, and identified in a reference measurement, is shown. The object O is thereby situated at a position P_0.

By means of the lidar sensor 1, recorded environmental data is, for example, used for the operation of an automated, in particular highly automated or autonomously operated vehicle or robot. For a reliable operation of the vehicle or robot, the understanding of a range of the lidar sensor 1 is absolutely necessary in order to correspondingly adjust an automated longitudinal and/or transverse control.

For identifying the range, the lidar sensor 1 is, for example, measured at the end of the line of a production of the vehicle or robot, for example on a so-called end-of-line test bench, EOL test bench for short, under predetermined conditions in a reference measurement. For example, with a predetermined background radiation of, for example, 50 klux for a reference target RZ with a defined size of, for example, 2 m×2 m and defined reflectivity of, for example, 10%, a range is determined, wherein a measuring point is obtained with a defined probability of, for example, 90%.

A reference noise level R_0 of infrared radiation S received by the lidar sensor 1 and shown in more detail in FIGS. 6 and 7, i.e., intensity of a received noise signal, is hereby identified. A noise curve identified in this way is shown here in simplified form as a straight line. Furthermore, an intensity I_0 of the lidar reflection LR recorded by means of the lidar sensor 1 is measured.

Furthermore, a signal-to-noise ratio is identified, that results if the infrared radiation S is reflected on a predetermined reference target RZ, which is situated at a defined distance d_0 in front of the lidar sensor 1 and that has the predetermined size and predetermined reflectivity. The range of the lidar sensor 1 is defined as the distance d, wherein the signal-to-noise ratio corresponds to a predetermined threshold value of the signal-to-noise ratio.

The signal-to-noise ratio of the lidar reflection LR of the reference measurement thereby arises according to:

$$SNR\_0 = \frac{I\_0}{R\_0} \tag{1}$$

The signal-to-noise ratio SNR_0 is then saved as the reference signal-to-noise ratio and the noise level R_0 is saved as the reference noise level R_0.

If the reference signal-to-noise ratio SNR_0 is the same as the predetermined threshold value of the signal-to-noise ratio, then the distance d_0 corresponds to the range of the lidar sensor 1.

If the reference signal-to-noise ratio SNR_0 is larger than the predetermined threshold value of the signal-to-noise ratio, i.e., the threshold value is still not met, then the range is larger than the distance d_0.

From a known damping of lidar radiation across the path length, because of which an intensity of the lidar radiation decreases quadratically with the path length, the path length by which the reference target RZ would have to be moved backwards can then be identified, so that a signal-to-noise ratio is obtained that is the same as the predetermined threshold value of the signal-to-noise ratio.

From the distance d_0 and the reference signal-to-noise ratio SNR_0, the range can thus be identified. The range can also be identified in that the reference target RZ is gradually moved backwards until the signal-to-noise ratio identified in the respective step corresponds to the threshold value of the signal-to-noise ratio.

Figure 2:
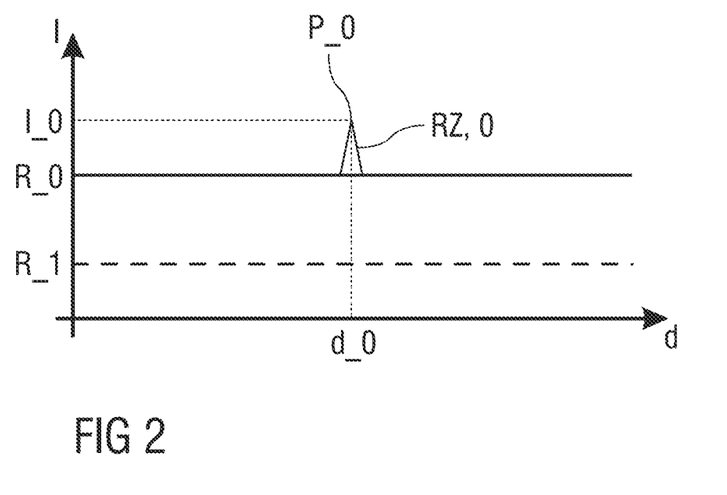

FIG. 2 shows an intensity I of a lidar reflection LR identified at night, in relation to a distance d_0 to an object O in comparison to the reference measurement according to FIG. 1.

During the normal operation of the vehicle or robot, for example after delivery of the vehicle or robot to a customer, the noise level is regularly re-measured during driving operation measurements.

A noise level R_1 is hereby identified at night, which is lower than the reference noise level R_0.

Figure 3:
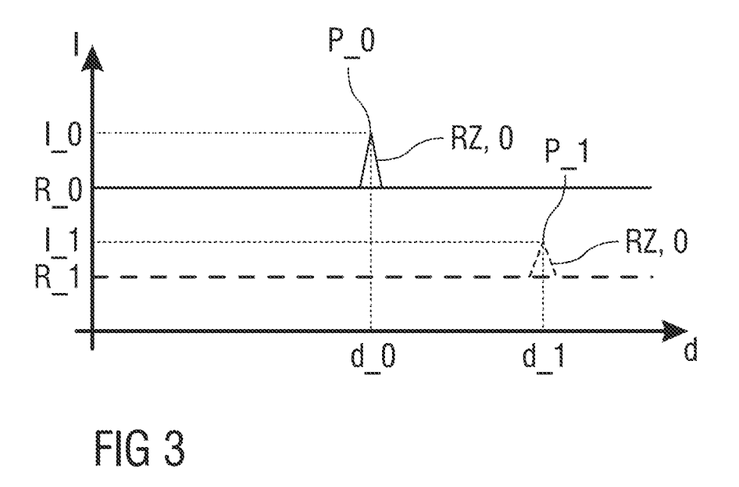

As FIG. 3 shows, it is now calculated at which position P_1 the reference target RZ has to be located in order to obtain the same signal-to-noise ratio with this lower noise level R_1 as with the reference measurement according to FIG. 1.

Under the condition that a signal-to-noise ratio SNR_1 identified from an intensity I_1 and the noise level R_1 according to $$SNR\_1 = \frac{I\_1}{R\_1} \quad (2)$$

during the driving operation measurement is the same as the reference signal-to-noise ratio SNR_0, this results in $$I\_1 = R\_1 \cdot SNR\_0 \quad (3)$$

A value of the intensity I_1 is hereby the value that would have to be measured in the presence of the noise level R_1, if the signal-to-noise ratio SNR_1 is the same as the reference signal-to-noise ratio SNR_0.

From the intensity I_1 and the known path-dependent damping of the lidar radiation, a theoretical distance d_1 to the position P_1 is identified, at which the reference target RZ would have to be positioned in order to obtain the same signal-to-noise ratio SNR_1=SNR_0.

The lower noise level R_0 has the consequence that the reference target RZ could also be detected at a larger distance with the same signal-to-noise ratio, as at the reference measurement. A distance d between the distance d_0 and the theoretical distance d_1 corresponds to an increase of the range of the lidar sensor 1, which arises if the reference noise level R_0 sinks to the noise level R_1. From the reduction of the noise level R_1 compared to the reference noise level R_0, the expected increase of the range of the lidar sensor 1 is thus identified.

Figure 4:
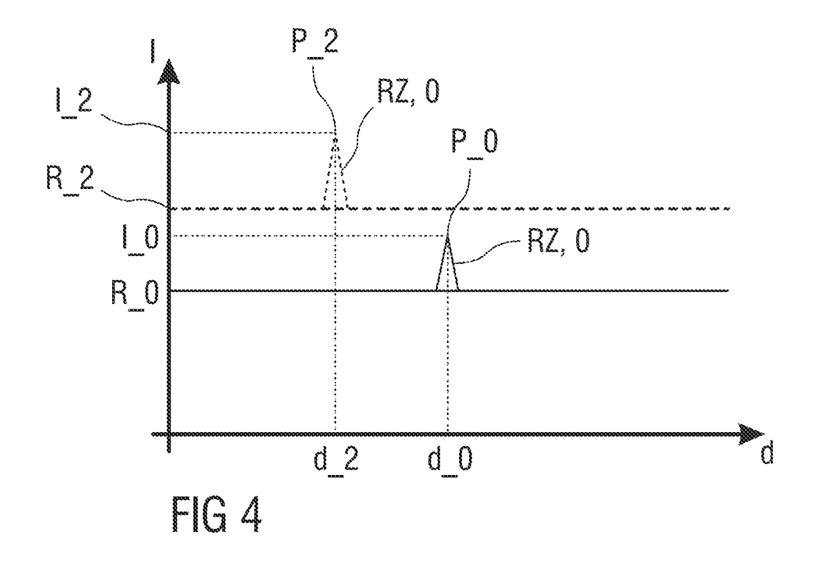

Similarly, the range of the lidar sensor 1 is identified if the measurement is carried out in sunlight. This is shown in FIG. 4.

A noise level R_2 is thereby recorded that is higher than the reference noise level R_0. A position P_2 is hereby calculated where the reference target RZ would have to be located if the same signal-to-noise ratio SNR_2 as the reference signal-to-noise ratio SNR_2 should be obtained. According to $$SNR\_2 = \frac{I\_2}{R\_2} \quad (4)$$

an intensity I_2

$$I\_2 = R\_2 \cdot SNR\_0 \quad (5)$$

thereby occurs.

A value of the intensity I_2 is thereby the value that would have to be measured in the presence of the noise level R_2, if the signal-to-noise ratio SNR_2 is the same as the reference signal-to-noise ratio SNR_0.

From the intensity I_2 and the known path-dependent damping of the lidar radiation, a theoretical distance d_2 to the position P_2 is identified, at which the reference target RZ would have to be located, in order to obtain the same signal-to-noise ratio SNR_2=SNR_0.

The higher noise level R_2 has the consequence that the reference target RZ could still only be detected at a lower distance with the same signal-to-noise ratio, as at the reference measurement. A distance d between the distance d_0 and the theoretical distance d_2 corresponds to a decrease of the range of the lidar sensor 1, which occurs if the reference noise level R_0 increases to the noise level R_2. From the increase of the noise level R_2 compared to the reference noise level R_0, the expected reduction of the range of the lidar sensor 1 is thereby identified.

Figure 5:
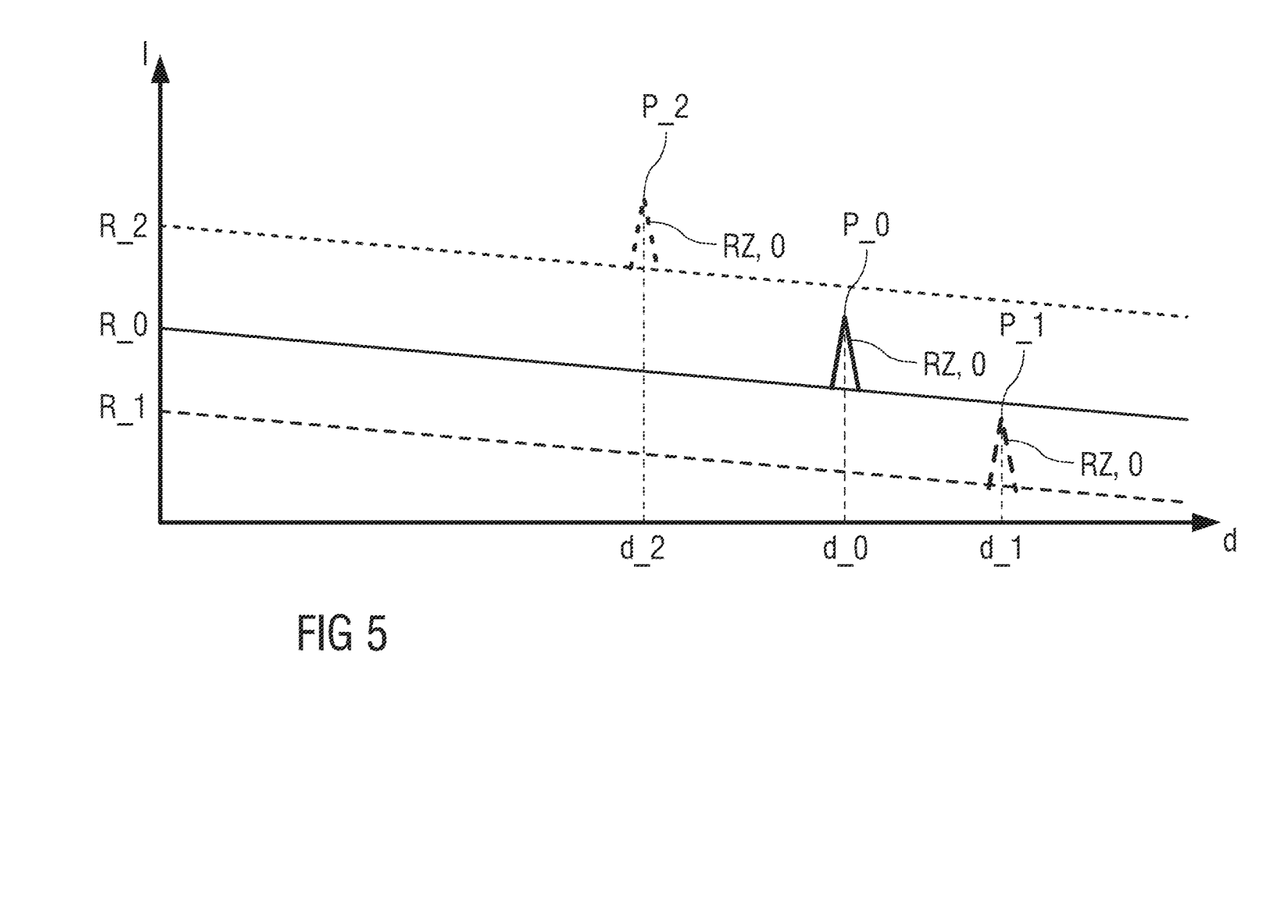

In FIG. 5, a comparison of an intensity I of a lidar reflection LR in relation to the respective distance d_0, d_1, d_2 to an object O in a reference measurement, a measurement carried out at night, and a measurement carried out in sunlight is shown.

A lidar sensor 1 is shown in FIG. 6 in a first state and in FIG. 7 in a second state.

The lidar sensor 1 comprises a transmitter 2, a receiver 3, a mirror 4, a transparent panel 5, and a source of infrared radiation 6, for example a power-controlled infrared LED.

The reference noise level R_0 includes an intrinsic noise component of the lidar sensor 1.

This intrinsic noise component can increase due to ageing. The increase of the intrinsic noise component leads to an increase of the noise level and of the reference noise level R_0. Since the signal-to-noise ratio is inversely proportional to the noise level, the increase of the noise level leads to a reduction of the signal-to-noise ratio. If the signal-to-noise ratio decreases, then the range of the lidar sensor 1 also decreases. The ageing-dependent increase of the intrinsic noise component thus has the consequence that the range of the lidar sensor 1 decreases.

If the reference measurement has already been carried out a long time ago and should be carried out again at a current point in time, then, for the same measuring conditions, new values for the reference noise level R_0 and the reference signal-to-noise ratio, and consequently also a new value for the range of the lidar sensor 1 emerge due to the ageing-related increase of the intrinsic noise component.

In order to take into consideration this ageing-related change of the range of the lidar sensor 1 in the driving operation measurements, the saved original values of the reference noise level R_0 and of the reference signal-to-noise ratio are updated to new values.

The updating can generally occur by replicating the reference measurement on the EOL test bench. This would however mean that a workshop visit is necessary.

In order to avoid this, in a possible embodiment, the updating is carried out by computation. To this end, an increase of the intrinsic noise $\Delta Ri$ is initially identified. The original reference noise level R_0 and the original reference signal-to-noise ratio SNR_0 are then corrected by the component that is to be attributed to the change of the intrinsic noise $\Delta Ri$. The result of this correction are an updated reference noise level R_0* and an updated reference signal-to-noise ratio SNR_0* according to:

$$R\_0^* = R\_0 + \Delta Ri \quad (6)$$

$$SNR\_0^* = \frac{I\_0}{R\_0^*} = \frac{I\_0}{R\_0 + \Delta Ri} \quad (7)$$

The infrared radiation S shown as a dashed line is a pulsed infrared laser beam produced by means of the transmitter 2. The infrared radiation S is pivoted over an environment to be scanned, with a rotating mirror 4. The proportion of the infrared radiation S reflected on objects O in the environment, so-called infrared reflection R (represented with solid lines), is directed onto the receiver 3, in particular a photodetector arrangement, with the rotating mirror. A distance d to a place of reflection is then identified from a signal transit time.

Due to the rotation of the mirror 4, dark phases, so-called dead measuring times, occur, in which no infrared reflection R reaches the receiver 3, as is shown in more detail in FIG. 7.

In such a dead measuring time of the lidar sensor 1, in which the receiver 3 is shielded from external radiation, the intrinsic noise component is identified, by sending a reference infrared signal RS to the receiver 3 in the dead measuring time by means of the source of infrared radiation 6 arranged inside the lidar sensor 1 in a darkened region B, and identifying a dark phase noise level.

During the dark phase, the receiver 3 only receives the reference infrared signal RS.

During the reference measurement on the EOL test bench, the noise level is identified in the dark phase and is saved as the dark phase noise level. The dark phase noise level can thereby also be an average value of the noise level identified in several dark phases.

In the normal operation of the vehicle or robot, this measurement is regularly repeated and a current dark phase noise level is identified. The difference between the current dark phase noise level and the saved dark phase noise level is subsequently identified. The identified difference corresponds to the desired change of the intrinsic noise component $\Delta Ri$.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS

1 Lidar sensor
2 Transmitter
3 Receiver
4 Mirror
5 Transparent panel
6 Source of infrared radiation
B Region
d Distance
d_0 Distance
d_1 Distance
d_2 Distance
1 Intensity
1_0 Intensity
1_1 Intensity
1_2 Intensity
LR Lidar reflection
O Object
P_0 Position
P_1 Position
P_2 Position
R Infrared reflection
RS Reference infrared signal
RZ Reference target
R_0 Reference noise level
R_1 Noise level
R_2 Noise level
S Infrared radiation

The invention claimed is:

1. A method for identifying a change of a range of a lidar sensor for a vehicle or a robot, the method comprising:
   in a reference measurement having a reference target located at a predetermined distance to the lidar sensor
      a reference noise level of infrared radiation received by the lidar sensor is identified, and
      a signal-to-noise ratio of infrared radiation reflected on the reference target and received by the lidar sensor is identified; and
   in a driving operation measurement, during a driving operation of the vehicle or robot
      a current noise level of infrared radiation received by the lidar sensor is identified,
      a theoretical distance to a position is identified, wherein the position is where the reference target ought to be if, at the current noise level, a same signal-to-noise ratio applies as in the reference measurement, and
      a difference is identified between the predetermined distance and the theoretical distance in a calculation of a change in range, wherein the difference corresponds to the change of the range of the lidar sensor compared to its range during the reference measurement.

2. The method of claim 1, wherein the range is defined as a distance, wherein the signal-to-noise ratio corresponds to a predetermined threshold value.

3. The method of claim 1, wherein a path-dependent damping of lidar radiation is taken into consideration when identifying the theoretical distance in the driving operation measurement.

4. The method of claim 1, wherein the reference measurement is performed again after a defined time.

5. The method of claim 1, wherein a change of an intrinsic noise component of the lidar sensor is taken into consideration when identifying the reference noise level in the reference measurement.

6. The method of claim 5, wherein the consideration of the change of the intrinsic component level occurs computationally so that the reference noise level and the signal-to-noise ratio at the reference target are corrected by a respective component, which follows from the intrinsic noise component.

7. The method of claim 5, wherein the intrinsic noise component is identified during a dead measuring time of the lidar sensor during which a receiver of the lidar sensor is shielded from external radiation, wherein during the dead measuring time, a reference infrared signal is sent to the receiver by a source of infrared radiation arranged inside the lidar sensor and a dark phase noise level is identified.

8. The method of claim 7, wherein the dark phase noise level is identified as an average of several dark phase noise levels.

9. The method of claim 7, wherein the dark phase noise level is identified during the driving operation of the vehicle or robot.

10. The method of claim 1, wherein the reference measurement is performed as an end-of-line test at the end of production of the vehicle or robot.

* * * * *